Figure 1:
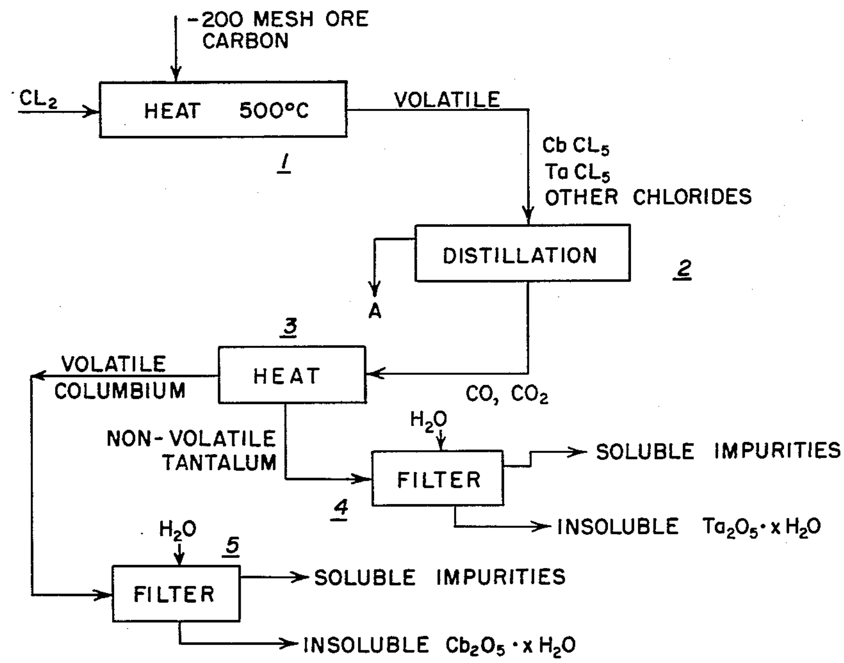

Dec. 5, 1961 J. O. GIBSON 3,011,866

SEPARATION OF COLUMBIUM AND TANTALUM

Filed Jan. 10, 1958

INVENTOR.
James O. Gibson
BY
[signature]
ATTORNEYS

United States Patent Office 3,011,866

Patented Dec. 5, 1961

3,011,866

SEPARATION OF COLUMBIUM AND TANTALUM

James O. Gibson, Littleton, Colo.
(58 Whitman Drive, New Providence, N.J.)

Filed Jan. 10, 1958, Ser. No. 708,307
7 Claims. (Cl. 23—17)

This invention relates to a commercial process for the separation of columbian, otherwise known as niobium, and tantalum from ores containing the elements.

Columbium, or niobium, is almost always found associated with tantalum in ores, and in the United States and the Western Hemisphere the metals have always been found associated together in relatively low grade deposits. As the uses of columbium and tantalum have expanded, the low grade ores become a commercial source of the metals. Chemically columbium and tantalum are very similar, making their separation very difficult. The known commercial processes for the separation of the two metals, which also includes the separation of the metals from a large number of other metals associated with them in ore which includes tungsten, molybdenum, iron, zircon, titanium, sodium potassium, calcium, etc., includes a fractional crystallization and a liquid-liquid extraction process. In each of these two known processes, however, the ore concentrates containing the metals are fused with sodium hydroxide, and the resultant products are leached with water and then with acid. The solutions of the metals are then subjected to the separation processes.

According to the present invention I provide a novel process for the separation of columbium from tantalum and for the separation of the two metals from other metals associated with them in an ore or an ore concentrate. The process includes an initial separation of columbium and tantalum and some of the other metals in a concentrate containing columbium, tantalum, and other metals, by heating oxides of the metals in the presence of carbon and chlorine to produce a volatile and a non-volatile fraction. The volatile fraction includes a major portion of the metals which are separated by condensation to produce a fraction containing a major portion of the tantalum and columbium. The columbium and tantalum values which are chlorides, resulting from the condensation are heated in the presence of carbon monoxide to provide separation of the columbium from the tantalum. One method is to heat the mixture in the presence of carbon while carbon dioxide gas is passing over the heated mixture. The carbon dioxide reacts with carbon to produce carbon monoxide. The carbon monoxide reacts with the metal chlorides to produce a volatile columbium and a non-volatile tantalum fraction. By hydrating separately the two fractions substantially pure columbium may be obtained from the volatile fraction while substantially pure tantalum oxide may be recovered from the non-volatile fraction.

Included among the objects and advantages of the present invention is to provide a simplified and highly efficient method for the separation of columbium and tantalum from a concentrate of the natural ores of the same, and to separate the columbium and tantalum from metals which are associated with them in the ore. The invention, also, includes an economical and highly efficient volatilization and distillation of compounds of columbium and tantalum and other metals associated with them in the ores, and thereby provide an effective separation of the metals. The process of the invention provides a non-aqueous method of separating columbium and tantalum.

Figure 2:
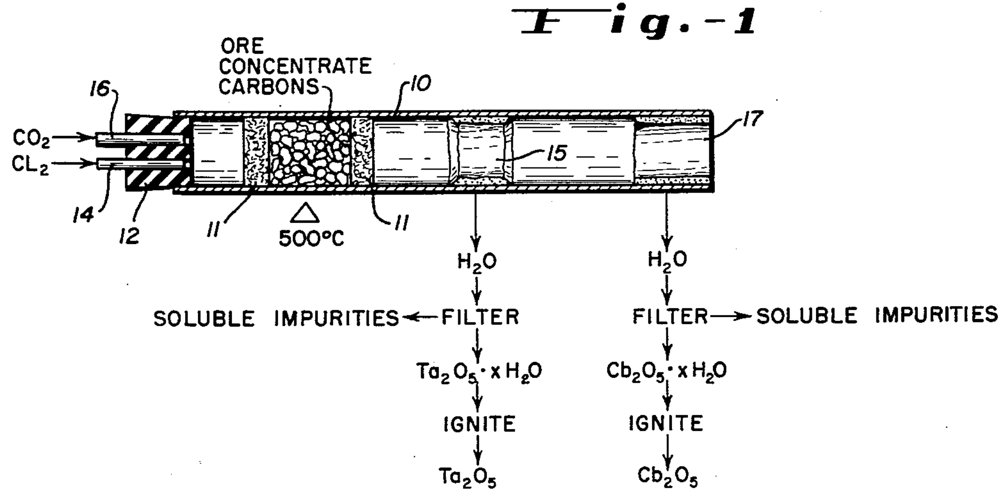

These and other objects and advantages of the present invention may be readily ascertained by referring to the following description and appended illustrations in which:

FIG. 1 is a schematic flow sheet illustrating process of the invention for separating columbium and tantalum from a concentrate of their ores, and FIG. 2 is a cross sectional view of a simplified batch process for carrying out the method of the invention, and includes a simplified flow sheet of the method for recovering and separating columbium and tantalum.

*Example I*

In carrying out the process of the invention an ore concentrate containing columbium and tantalum ground to about 200 mesh is mixed with carbon. The mixture of concentrate and carbon was heated to about 500° C. and during the heating chlorine gas was passed through the mixture. A simplified batch process is illustrated in FIG. 2 where a mixture of five grams of columbium pentoxide and five grams of tantalum pentoxide are mixed with 1.1 grams of carbon and placed in a four foot length of one inch diameter Pyrex tubing 10. The mixture of the ore and carbon is placed between glass wool plugs 11, and a stopper 12 containing two inlets is placed in the end of the tube adjacent the ore-carbon mixture. The ore and carbon mixture is heated to 500° C. by a burner, and chlorine gas is introduced into the mixture through inlet 14 during the heating. This treatment converts the columbium and tantalum from the pentoxide form to the pentachloride form. The materials are sublimed and pass through the plug and condense at about positions 15 in the tube. When the conversion of the pentoxides to the pentachlorides is complete, the chlorine gas was ceased and carbon dioxide was introduced through inlet 16. The material sublimes in the presence of carbon monoxide ($C+CO_2+heat=2CO$) then condenses along the tube. The heat is applied at 11. The material remaining at position 15 (the material which did not sublime) is dissolved in water, and after filtering, the undissolved residue (by analysis) contains 89 plus percent of tantalum pentoxide and less than about 5% of columbium oxide. The material that sublimes is condensed on the cool part of the tube 17 near the outer end thereof. This condensed material is dissolved in water to hydrolyze the same. The aqueous mixture is filtered to remove the soluble impurities, and the residue by assaying was shown to contain 75 plus percent of columbium oxide and less than about 23% tantalum oxide. As illustrated in the partial flow sheet, the non-soluble material from portion 15 of the tube after being hydrolyzed and filtered produced a material containing water (tantalic acid—$H_2Ta_2O_6$), which after being ignited was recovered as tantalum pentoxide. The same is true with the columbium which is recovered as a material having X waters of hydration (columbic acid—$H_2Cb_2O_6$) and on igniting the same is reduced to columbium pentoxide.

*Example II*

A flotation concentrate (the mineral pyrochlore) from the Oka deposit in Quebec Province of Canada was treated in a manner similar to that described in the figure for Example I. The concentrate analysis is as follows:

| Kennecott Copper analysis: | Percent |
|---|---|
| $Cb_2O_5$ | 10.6 |
| $Ta_2O_5$ | 0.4 |
| $Fe_2O_3$ | 12.7 |
| $CaO$ | 18.2 |
| $SiO_2$ | 19.1 |
| $MgO$ | 6.5 |
| $TiO_2$ | 3.7 |
| $P_2O_5$ | 0.5 |

X-ray analysis (Merlyne Salmon):

| | Percent |
|---|---|
| Ce | 1.4 |
| La | 0.4 |
| Y | 0.03 |
| Zr | 0.4 |
| Sr | 0.3 |
| U | 0.14 |
| Th | 0.09 |
| Zn | 0.02 |
| Cb | 10.0 |
| Ta | 0.5 |
| Fe | 14.0 |
| Mn | 1.3 |
| Nd | 0.4 |
| Ti | 3.0 |

The concentrate was chlorinated by heating a 200 mesh ground sample with chlorine gas to a temperature of about 500° C. After the chlorination was completed, carbon dioxide was passed through the mixture to sublime off various fractions thereof. The sublimed material was recovered, hydrolyzed in water and filtered. The hydrated material from the sublimed portion was ignited and on analysis showed that it contained 96% columbium pentoxide, 3% tantalum pentoxide and 0.5% of zirconium oxide. (This illustrated that carbon dioxide made no separation; Example III illustrates that carbon monoxide was required to form a non-volatile compound.)

*Example III*

Another sample of the Oka ore (with carbon in accordance with Example I) was chlorinated and after the completion of the chlorination, carbon dioxide was passed through the ore with the heating being applied to the residue to form carbon monoxide ($C+CO_2 \rightarrow 2CO$). The sublimed material was recovered by condensation. After hydrolysis, filtering, and igniting the residue therefrom as before, the oxides analyzed 96.5% columbium pentoxide while tantalum pentoxide was not detected by the analysis, (degree of detection about 0.005 to 0.01% tantalum pentoxide) and zirconium oxide was analyzed to be present at about 0.6%.

The flow sheet of FIGURE 1 illustrates the process, where a charge of minus 200 mesh ore or a concentrate thereof is heated to about 500° C. with about 110% of the theoretical amount of carbon required for oxide reduction. Chlorine gas is passed through the heated charge to chlorinate the columbium, tantalum and several other metals. At about 450–500° C. columbium pentachloride, tantalum pentachloride and other chlorides sublime from the charge. By distillation the other chlorides may be effectively separated as at A, by known procedures. The residue from the distillation step 2 is heated to about 500° C. in the presence of carbon monoxide, as at stage 3 where the volatile columbium composition sublimes. This material is condensed and is hydrolyzed in water and the soluble impurities are filtered from the insoluble columbium pentoxide. The non-volatile residue of the third step is hydrolyzed in water and the soluble impurities filtered off leaving an insoluble product of tantalum oxide. The hydrolyzing of the columbium and tantalum chlorides produces a fine, difficult to filter composition and a filter aid, such as Separan, may be used in the filtration. Using an ore such as the Oka ore, the non-volatile residue remaining from the first stage chlorination includes such chlorides as sodium chloride, calcium chloride, potassium chloride, thorium chloride, uranium chloride, manganese chloride, rare earth chlorides, etc. The volatile matter includes columbium pentachloride, tantalum pentachloride, ferrous chloride, zinc chloride, titanium chloride, tin chloride, etc. The distillation step 2 removes titanium chloride, silicon chloride, etc. The volatile material leaving stage 3 includes the columbium, iron, aluminum, etc. The iron, aluminum etc. are removed as soluble impurities, while the insoluble columbium is recovered as the oxide.

In commercial practice it may be found advantageous after fractionating the titanium chloride away from the columbium chloride, tantalum chloride, iron chloride, etc. to place the columbium chloride, tantalum chloride, etc. in a separate reaction vessel—add or pressurize in the stoichiometric amount of carbon monoxide (CO) and then distill the columbium chloride away from the non-volatile fraction, thereby making more efficient use of chemicals (CO, $CO_2$) and getting quantitative separation of the columbium and tantalum.

Also, carbon monoxide gas is the chemical of choice and is readily metered as a fairly pure gas, rather than carbon dioxide gas. On a small scale it is convenient to generate it in the reaction equipment by passing carbon dioxide through hot carbon.

In the hydrolysis of sublimed anhydrous chloride materials as described in the above examples, water or dilute acid may be used, particularly in the final washings, to remove the last traces of soluble chlorides.

While the invention has been illustrated by reference to specific embodiments, there is no intent to limit the scope of the invention to the precise details so set forth, except insofar as defined in the following claims.

I claim:

1. The process of separating columbium values from tantalum values and from their natural ores which includes other metals comprising treating an intimate mixture of such an ore and carbon with chlorine gas at about 500° C., condensing the columbium and tantalum reaction products of the resultant volatile composition, treating the condensed columbium and tantalum portions with carbon monoxide gas at about 500° C., recovering the resultant volatile composition thereof as a columbium product, and recovering the resultant non-volatile composition as a tantalum product.

2. The process of separating columbium values from tantalum values and from their natural ores which includes other metals comprising treating an intimate mixture of such an ore and carbon with chlorine gas at about 500° C., condensing the columbium and tantalum reaction products from the resultant volatile material, treating the condensed columbium and tantalum portions with carbon monoxide gas at about 500° C., recovering the resultant volatile composition thereof, hydrolyzing the resultant recovered volatile composition to produce a columbium oxide as a precipitate, hydrolyzing the resultant non-volatile composition thereof to produce a tantalum oxide as a precipitate.

3. The process of separating columbium values from tantalum values and from their natural ores which includes other metals comprising chlorinating an intimate mixture of such an ore and carbon at about 500° C., condensing the columbium and tantalum reaction products of the resultant volatile product, treating the condensed columbium and tantalum portions with carbon monoxide gas at about 500° C., recovering the resultant volatile composition thereof, hydrolyzing the resultant recovered volatile composition with dilute acid to produce an insoluble columbium oxide, and hydrolyzing the resultant non-volatile composition to produce an insoluble tantalum oxide.

4. The process of separating columbium values from tantalum values and from their natural ores which includes other metals comprising chlorinating an intimate mixture of such an ore and carbon at about 500° C., condensing the columbium and tantalum chloride reaction products of the resultant volatile product, treating the condensed columbium and tantalum portions with carbon monoxide gas at about 500° C., recovering the resultant volatile composition, hydrolyzing the said resultant volatile composition to remove soluble impurities and recover an insoluble columbium oxide, and hydrolyzing the non-volatile composition thereof to remove soluble impurities and recover an insoluble tantalum oxide.

5. The process of separating columbium values from tantalum values and from their natural ores which includes other metals comprising chlorinating an intimate mixture of such an ore with carbon at about 500° C. to produce a first volatile composition inclusive of columbium and tantalum reaction products, fractionating the resultant first volatile composition to separate columbium and tantalum compositions, heating the columbium and tantalum compositions with carbon monoxide gas to about 500° C. to produce a second volatile composition and a non-volatile composition, hydrolyzing the second volatile composition with dilute acid to remove soluble impurities and recover an insoluble columbium oxide, and hydrolyzing the non-volatile composition with dilute acid to remove soluble impurities and to recover an insoluble oxide.

6. In the process of separating columbium from tantalum and from mixtures containing the same, the steps which comprise heating a said mixture and carbon monoxide with chlorine gas at about 500° C. to form volatile and non-volatile compositions, hydrolyzing the resultant volatile compositions to recover insoluble columbium oxide therefrom, and hydrolyzing the resultant non-volatile compositions from the heating step to recover insoluble tantalum oxide therefrom.

7. In the process of separating columbium from tantalum and from mixtures containing the same the steps which comprise heating a crude mixture of columbium pentachloride and tantalum pentachloride along with other metallic chlorides as impurities in the intimate presence of carbon monoxide at about 500° C. to form volatile and non-volatile compositions, hydrolyzing the resultant volatile compositions to recover insoluble columbium oxide from soluble impurities, and hydrolyzing the resultant non-volatile composition from the heating step to recover insoluble tantalum oxide from soluble impurities.

References Cited in the file of this patent

UNITED STATES PATENTS

| | | |
|---|---|---|
| 1,822,266 | Becket | Sept. 9, 1931 |
| 2,429,671 | Cuvelliez | Oct. 28, 1947 |
| 2,766,112 | Schafer | Oct. 9, 1956 |
| 2,928,722 | Scheller | Mar. 15, 1960 |

FOREIGN PATENTS

| | | |
|---|---|---|
| 644,454 | Great Britain | Oct. 11, 1950 |
| 893,197 | Germany | Oct. 15, 1954 |

OTHER REFERENCES

May et al. in Industrial and Engineering Chemistry, December 1954, pages 2495–2500.

Hampel: "Rare Metals Handbook," publ. by Reinhold Publ. Corp., N.Y., 1954, page 396.

Mellor: "Comprehensive Treatise on Inorganic and Theoretical Chemistry," vol. 9, 1929, page 843.